US012518740B1

United States Patent
Carre et al.

(10) Patent No.: US 12,518,740 B1
(45) Date of Patent: Jan. 6, 2026

(54) SEMANTIC CLUSTERING FOR MACHINE SELF-LEARNING

(71) Applicant: Amazon Technologies, Inc., Seattle, WA (US)

(72) Inventors: Adrien Carre, Brooklyn, NY (US); Jakub Dominik Bochynski, Tarnobrzeg (PL); Azimjon Pulatov, Warsaw (PL); Konrad Ryszard Budzynski, Wroclaw (PL); Carlos Emmanuel Gonzalez Sandoval, Franklin, MA (US); Sarah Keating Traylor, Hingham, MA (US); Vivek Gupta, Somerville, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 316 days.

(21) Appl. No.: 18/242,937

(22) Filed: Sep. 6, 2023

(51) Int. Cl.
G06F 40/30 (2020.01)
G10L 15/01 (2013.01)
G10L 15/06 (2013.01)
G10L 15/18 (2013.01)
G10L 15/183 (2013.01)

(52) U.S. Cl.
CPC .......... G10L 15/01 (2013.01); G10L 15/063 (2013.01); G10L 15/1815 (2013.01); G10L 15/183 (2013.01)

(58) Field of Classification Search
None
See application file for complete search history.

(56) References Cited

U.S. PATENT DOCUMENTS

| | | | |
|---|---|---|---|
| 10,282,419 B2 * | 5/2019 | Hebert | G06F 16/3344 |
| 11,977,836 B1 * | 5/2024 | Archambeau | G06F 40/279 |
| 2017/0162189 A1 * | 6/2017 | Cao | G06N 3/088 |
| 2019/0189527 A1 * | 6/2019 | Specht | H01L 22/12 |
| 2020/0394725 A1 * | 12/2020 | Bharti | G06Q 10/06316 |
| 2022/0327288 A1 * | 10/2022 | Van Durme | G06F 40/30 |

* cited by examiner

Primary Examiner — Jakieda R Jackson
(74) Attorney, Agent, or Firm — K&L Gates LLP

(57) ABSTRACT

Devices and techniques are generally described for semantic clustering and fixing of like-failed processing inputs. In some examples, first embedding data representing a first input may be generated. A first cluster of embeddings including the first embedding data may be generated. Second embedding data of the first cluster may be determined. First metadata for the first input may be determined. The first metadata may be associated with processing of the first input by the processing system. Second metadata for the second input may be determined. A first remedial action may be determined for processing the first input based at least in part on the first metadata and the second metadata.

20 Claims, 8 Drawing Sheets

SEMANTIC CLUSTERING FOR MACHINE SELF-LEARNING

BACKGROUND

People can interact with computing devices using spoken commands. In some systems, a "wakeword" is used to activate functionality. Natural language processing is used to transform the spoken requests that follow into a computer directive for performing a task.

DETAILED DESCRIPTION

Figure 1:
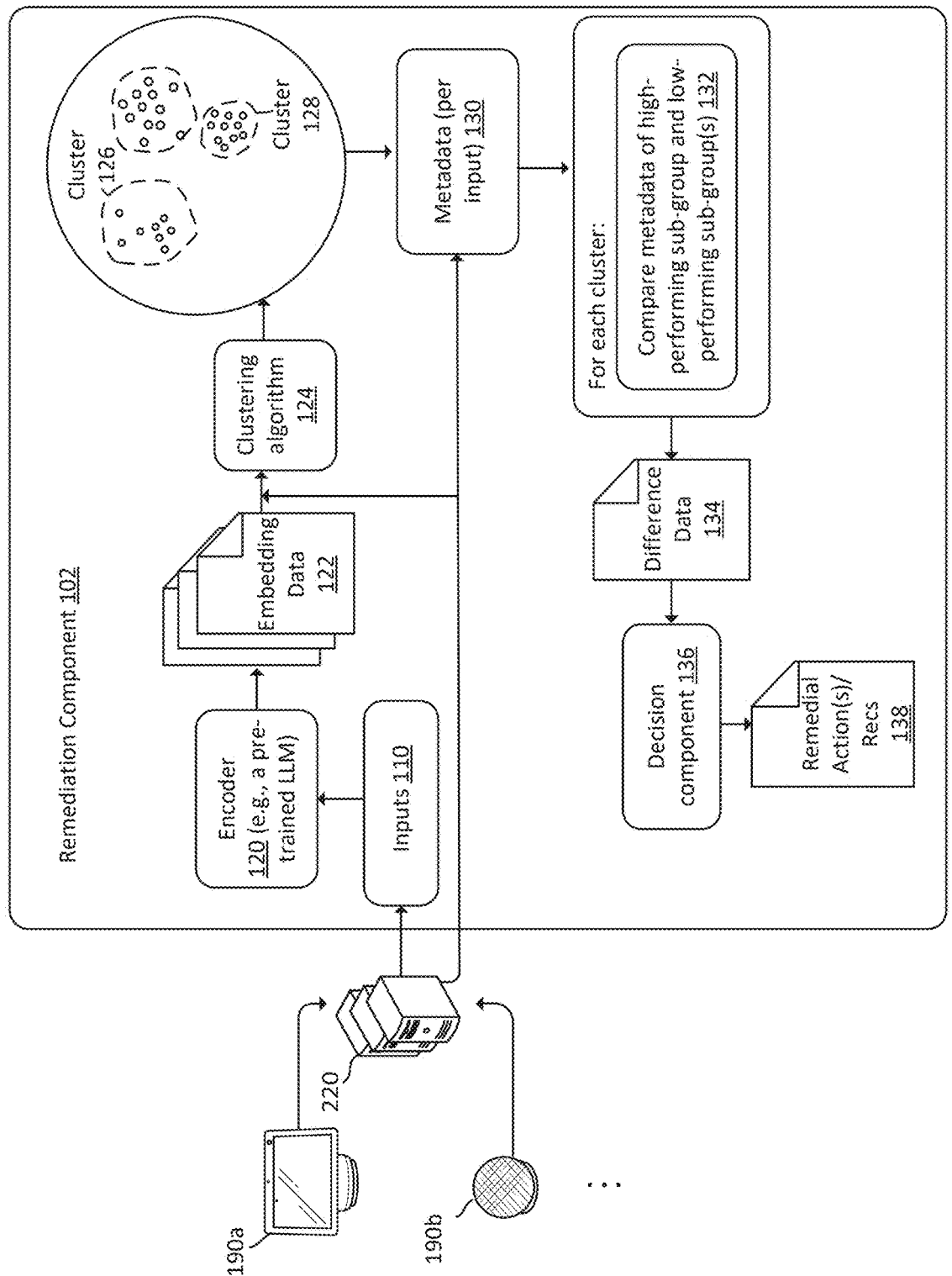
FIG. 1 is a block diagram illustrating a natural language processing remediation component, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Natural language processing systems may employ a variety of different systems and/or components in order to understand human speech and/or other natural language inputs in order to perform some action in response to a natural language input. It can be difficult to ascertain the cause of failure in cases where a natural language processing system fails to produce the desired response for a given user input. For example, the issue may be that the automatic speech recognition (ASR) component of the natural language processing system generated an inaccurate transcription of a spoken request, which contributed to downstream components that determine the intent of the words to mis-understand what was meant. In another example, the issue may be that a natural language understanding (NLU) component of the natural language processing system determined an incorrect intent (e.g., a "playMusic" intent instead of a "playMovie" intent) for the request (even if the ASR transcription of the audio was correct). In other examples, an entity recognition component error may resolve one or more tokens of the user's request to an incorrect entity (e.g., by misclassifying the entity-assigning it to the wrong category or type (e.g., identifying a person's name as a location)), by omitting an entity (e.g., the system may fail to recognize entities in a user's request altogether), ambiguity error (e.g., where entity recognition may determine that a request refers to the city of Paris in Texas instead of the city of Paris in France), etc. In still other examples, processing of a natural language request may fail due to the request being routed to the wrong speech processing application (e.g., where a spoken request to turn on a smart light is routed to a music domain). Due to the myriad of different potential issues and points of failure in these complex technical systems that perform, for example, natural language processing (or that may result in a less-than-optimal user experience), it can be difficult to ascertain the cause of the issue. Similar challenges may be present in other, non-language processing systems that have multiple sub-components whose downstream processing relies on upstream processing and the user only has interaction with the overall system's inputs and outputs. Manual investigation may not be scalable and/or practical given the large number of different utterances, phrasings, and speech processing technologies at issue. The various systems and techniques described herein may be used to implement self-learning in multi-stage processing systems to detect and/or remediate processing defects.

Described herein are systems and techniques that may be used to, among other things, automatically determine natural language and other types of complex, multi-stage system processing defects for different inputs and recommend remedial actions that may include recommended fixes and/or automated fixes. Prior to the systems and techniques described herein, natural language processing developers (including scientists, linguists, product managers, analysts, and engineers) and/or other multi-stage processing system developers may spend hours manually finding failing inputs (e.g., natural language processing requests that resulted in processing failure and/or sub-optimal user experiences), identifying root causes of such failures, determining overall user impact, determining fixes for the defects identified, and implementing a fix. With the various systems and techniques described herein (including the remediation component described in further detail below), no manual input analysis is required. Instead, the systems and techniques may scan input data periodically (e.g., daily or at any desired timing interval whether periodic or non-periodic), identify defects and their root cause, and provide a remedial action across all error classes (e.g., ASR, NLU, ER, LLM-based processing errors, False Wake (of a speech processing device), Result, etc.).

An "utterance" as used herein, can refer to any natural language input whether spoken, written, or otherwise provided to a natural language processing system. "Failure" and/or "failed," as used herein, can refer to processing by a natural language processing system that results in processing failure (e.g., no result is generated by the natural language processing system due to an error of one or more components) and/or a sub-optimal result (e.g., an action is taken in response to the natural language input, but the action differs from the user-desired action).

Failures may be user-facing failures, such as processing defects that may be detectable by an end user of a multi-stage processing system where the output of one subsystem is used as an input to one or more other subsystems. For example, user-facing failures in a natural language processing system may include errors with speech recognition, natural language understanding, system processing, etc. Failures may, generally, fall into three main categories: 1) regressions and emergent defects, where a failure appears as a result of system changes, deployments, or external events (e.g., a new album being released by a music artist); 2) ongoing defects, where a problem or low accuracy with respect to a particular utterance is long-lasting; and 3) feature gaps, where users ask for functionality that is currently unsupported by the natural language processing system. The various systems and techniques described herein may be used to provide self-learning for such multi-stage processing systems, whereby remedial actions (including recommended fixes) may be determined for the various different failure categories.

Machine learning techniques can be used to form predictions, solve problems, process natural language requests, recognize objects in image data for classification, etc. For example, machine learning techniques may be used to detect objects represented in image data, translate text from one spoken language to another, determine semantic interpretations of speech, etc. In various examples, machine learning models may perform better than rule-based systems and may be more adaptable as machine learning models may be improved over time by retraining the models as more and more data becomes available. Accordingly, machine learning techniques as described herein can be adaptive to changing conditions. Deep learning algorithms, such as neural networks, may be used to detect patterns in data and/or perform tasks.

In some cases, artificial intelligence algorithms, such as machine learning models, may perform better is some scenarios and/or for some inputs relative to others. For example, supervised machine learning classifiers (e.g., classifier models) may be better able to classify instances that are similar to instances of known classes present in the training data (e.g., training instances). In some cases, the performance of artificial intelligence algorithms, such as machine learning models, may suffer for certain classes when such classes are not sufficiently represented in the training data. For example, an object detection computer vision algorithm that has been trained to detect obstacles may have difficulty detecting animals or plants when such classes are not sufficiently well represented in the training data corpus.

In a natural language understanding context, machine learning models (including large language models (LLMs)) may be trained to determine representations of various aspects and/or characteristics of natural language inputs. For example, machine learning models may generate text transcriptions (or other representations), semantic interpretations, entity recognition, etc. for input human speech (or text).

In some machine learned models, such as neural networks, parameters control activation values in neurons within layers of the machine learned models. The weighted sum of activation values of each neuron in a preceding layer may be input to an activation function (e.g., a sigmoid function, a rectified linear units (ReLU) function, etc.). The result determines the activation value of a neuron in a subsequent layer. In addition, a bias value can be used to shift the output of the activation function by adding to or subtracting from the activation value, and thus may bias a neuron toward activation (or inactivation).

In some machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize the cost. For example, the machine learning model may use a gradient descent algorithm to incrementally adjust the weights to cause the most rapid decrease to the output of the loss function. The method of updating the parameters of the machine learning model may be referred to as back propagation.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, NLG, and TTS may be used together as part of a natural language processing system. Natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "natural language request data." Such request data may change forms many times during processing of the request data by various components of the speech processing system. For example, initially the request data may be audio data and/or input text data representing a user question. The audio data may be transformed into text data and/or other type of ASR output data by an ASR component of the speech processing system. The ASR output data may be transformed into intent data by an NLU component of the speech processing system, which represents the semantic meaning of the natural language input. The intent data may be used by a speech processing application (e.g., a skill) to determine an action (e.g., to generate action data, such as initiating NLG and/or TTS processing to use synthetic speech to answer a user's question, play video, play audio, turn ON/OFF a light, tune a TV/radio, adjust temperature of thermostat, send a message, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during and/or after natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Bard and/or Google Assistant systems from Google LLC of Mountain View, California, Dragon speech recognition software and the Copilot system from Microsoft Corporation of Redmond, Washington, the Alexa system from Amazon.com, Inc. of Seattle, Washington, etc. The various natural language processing techniques described herein may be executed on any type of computing device. Some example natural language processing enabled devices may include mobile devices (e.g., on a user's phone, laptop, etc.), smart speakers, embedded systems (e.g., smart lights, smart appliances), vehicle computing systems, desktop devices, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a wakeword (e.g., a predetermined keyword, multi-word phrase, non-spoken audio event, etc.) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further natural language processing (e.g., ASR, LLM processing, etc.). In various examples, the wakeword detection component may be used to distinguish between audio that is intended for the natural language processing system and audio that is not intended for the natural language processing system.

FIG. 1 is a block diagram illustrating a remediation component 102 that may be used provide self-learning for a multi-stage processing system. In this context, self-learning may include detection and/or remediation of processing defects for various different types of inputs and/or intermediate data generated and/or used during processing. In many of the examples described herein, natural language processing is used as an example of a multi-stage processing system for which the remediation component 102 may be useful. However, it should be noted that the remediation component 102 may be used in any multi-stage processing system and is not limited to use in the natural language processing context. Various components of FIG. 1 may be further described below in reference to various other figures. In various examples, a device 190a, 190b, etc., may receive an input 110 (e.g., a natural language input comprising a request to perform some action). For example, the natural language request may be a spoken request (or a text request) to play music, play video, answer a question, control a device, and/or take some other action. Devices 190a, 190b, etc., may be examples of natural language processing enabled devices. Devices 190a, 190b, etc., may include one or more microphones and may listen for a wakeword. Upon detection of the wakeword, the devices 190a, 190b, etc., may capture audio data representing the natural language input (e.g., a spoken input) for further natural language processing (including ASR processing, prompt generation, LLM processing, action plan generation, and/or various application programming interface calls, data retrievals, and/or processing by one or more other applications. In various examples, audio data representing the audio captured after the wakeword may be sent to a natural language processing system 220 for natural language processing. However, in some other examples, the natural language processing system 220 may be implemented, wholly or in part, on devices 190a and/or 190b, depending on the implementation.

In various examples described herein, the natural language processing system 220 may be implemented using language modeling (LM). Language modeling (LM) is the use of various statistical and probabilistic techniques to determine the probability of a given sequence of words occurring in a sentence. LM can be used to perform various tasks including generative tasks that involve generating data (such as the action plan data described below) rather than discriminating between predefined classes. Language models analyze bodies of text data to provide a basis for their word predictions. The language models are generative models. In some embodiments, the language models may be a large language model (LLM). An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM may use an expansive training dataset, as compared to a language model, and can include a large number of parameters (in the range of billions), hence, they are called "large" language models. In some embodiments one or more of the language models (and their corresponding operations, discussed herein below) may be the same language model.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. In some examples, the system may perform processing on the ASR data to determine a prompt that may be used as an input to an LLM. The LLM may be trained to generate an action plan comprising a series of actions that may be used to respond to the natural language input.

For example, in response to the user input "Please plan a 4-person trip to [Location] from [Date 1] to [Date 2]," the system may determine that the user wants to book a trip to [Location] during the specified dates. Thereafter, the system may use the language model(s) to generate an action plan comprising one or more tasks associated with booking the trip (e.g., (1) find a flight ticket from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.) configured to perform action(s) associated with a task.

The language model(s) may generate an output indicating one or more application programming interface (API) calls requesting that the one or more components return a description of the action(s) they are configured to/will perform with respect to the user input and/or current task. As used herein, an "API call" is an instruction/request for the corresponding API to perform a particular action (e.g., an API call of turn_on_device (device="indoor light 1") corresponds to an instruction/request to an API to turn on a device associated with the identifier "indoor light 1"). The system may execute the API calls and the language model(s) may determine that a first component (e.g., a travel booking website) of the one or more components is configured to perform an action responsive to the user input/task. The system may then perform as discussed herein above with respect to a next task (e.g., find a hotel in [Location] between [Date 1] and [Date 2]) of the one or more tasks. Thereafter, the language model(s) may determine that one or more components have been selected to perform the action(s) responsive to the user input, generate a response informing the user of the actions to be performed, and, with authorization, cause the one or more components to perform the action(s).

Accordingly, the natural language processing system 220 may be a multistage processing system where intermediate data output by some subsystems of the natural language processing system 220 serve as inputs to other subsystems. For example, the ASR output of a spoken user input may serve as the input to a prompt generation component that may generate a prompt representing the ASR output. The prompt may be input into an LLM that may generate action plan data comprising multiple API calls. The action plan data may comprise parameters that may serve as inputs to the APIs implicated by the action plan data. The LLM agent components, skills, and/or other applications associated with the APIs may return various data specific to the functionality of those components, skills, and/or applications. These various different processing stages may represent multiple potential points of failure and/or points at which error may be introduced to the system. Such errors and/or non-optimal actions may result in an unsatisfying and/or inoperable user experience in some cases.

Accordingly, described herein are systems and techniques that may be used to, among other things, automatically determine natural language and other types of complex, multi-stage system processing defects for different inputs and recommend remedial actions that may include recommended fixes and/or automated fixes. As described in further detail below, the remediation component 102 may scan input data, identify defects at the various different processing stages (e.g., ASR, prompt generation, action plan, API selection and/or parameters, etc.) including the root cause of such defects, and provide a remedial action across different processing stages and/or error classes.

Periodically, inputs 110 (e.g., previously-processed utterance data) received by the natural language processing system 220 (whether implemented by device(s) 190a, 190b, or separately implemented) may be evaluated by the remediation component 102. The inputs 110 may comprise text transcriptions representing the requests. The text transcriptions may be embedded using an encoder 120 (such as a pre-trained LLM, such as the Bidirectional Encoder Representations from Transformers (BERT) or some other encoder model that has been trained to generate embeddings representing text inputs) to generate per-utterance embedding data (e.g., embedding data 122). Other embedding models that may be used may include Word2Vec (word to vector model), GloVe (Global Vectors model), fastText, etc. These models may be used to generate embeddings representing the input for a natural language processing system. However, when remediation component 102 is used in other (e.g., non-NLP) contexts, the selection of the embedding model used to encode the input may depend on the type of input data. For example, if image data is input, the embedding model may include a convolutional neural network (CNN), a vision transformer, etc. In the NLP example shown in FIG. 1, for a given input 110 (e.g., an utterance), the input's embedding data 122 may be numeric data (e.g., a multi-dimensional vector representation) that semantically represents the utterance and/or its context in a high-dimensional embedding space.

The embedding data 122 for the inputs 110 may be input into a clustering algorithm 124. The clustering algorithm 124 may be an unsupervised machine learning technique (model) that may be used to assign similar embeddings (embedding data 122) to the same cluster based on the similarity of the underlying inputs 110 (and their context). Unsupervised clustering does not rely on predefined labels for the embedding data 122 or target variables. Instead, the clustering algorithm 124 analyzes the underlying patterns and relationships within the embedding data 122 to determine groupings (clusters). The goal of clustering algorithm 124 is to group the embedding data 122 into subsets (clusters), where the data points (e.g., the embeddings) within each cluster are more similar to each other than to those in other clusters. The similarity between data points may be determined using some distance or similarity metric (cosine similarity, cosine distance, Euclidean distance, etc.). Any desired clustering algorithm may be used to implement clustering algorithm 124, depending on the desired implementation. Some examples may include k-means clustering, hierarchical clustering, Density-based Spatial Clustering of Applications with Noise, Gaussian mixture models, k-nearest neighbors (kNN), etc. After clustering, the embedding data 122 may be grouped into clusters that represent semantically-similar inputs (e.g., utterances). As shown in FIG. 1, the determined clusters include cluster 126, 128, etc. Any number of clusters may be generated.

Generally, the closer two inputs are to one another within the embedding space, the more similar the utterances are semantically. For example, the embeddings for the utterances "Call Bob" and "Call Bob, please" may have embeddings that are highly similar, while an utterance "Play some jazz" may have an embedding that is significantly different from "Call Bob." Indeed, the embedding for "Play some jazz" would be likely grouped in a different cluster with respect to the embeddings for "Call Bob" and "Call Bob, please" (which would likely be grouped in the same cluster).

Metadata 130 (e.g., for each of the inputs 110) may be received from the natural language processing system 220. The metadata 130 may describe how each of the inputs 110 was processed by the natural language processing system 220. This metadata 130 may include a variety of information including error metric data, intermediate processing results, etc. Examples in the natural language processing context may include top ASR hypotheses, ASR confidence levels (e.g., per-ASR hypothesis), the determined intent for the utterance, the top-intent hypotheses, NLU error %, action plan data, API calls, prompt data, resolved slot data (including recognized named entities), device type (by which the natural language request was received), user experience metrics (e.g., cause of failure (COF) (e.g., failure type), estimated turn error rate (ETER), user perceived defect rate (PDR), friction, etc. Additionally, at least some of metadata 130 may be used by clustering algorithm 124 during the clustering of embedding data 122.

PDR is a metric that assesses the quality or performance of the natural language processing system 220 from the perspective of the user. PDR measures the probability that the user perceives some defect in the output of the system (e.g., misrecognitions, inaccuracies, unnatural-sounding speech, etc.). In some examples, PDR may be output by a supervised machine learning model that may be trained using utterance data that has been labeled by end users (e.g., according to whether the output of the natural language processing system for the utterance was defective in some way). Accordingly, PDR scores may represent a prediction of a subjective appraisal of the natural language processing system's per-utterance output.

As previously described, large-scale speech processing assistants may process requests through a series of modules for wake word detection, speech recognition, language understanding (including entity recognition), and/or response generation. An error in one of these modules can cascade through the system. Given the large traffic volumes in many speech processing assistants, it may be infeasible to manually analyze the data, identify requests with processing errors and isolate the source of error (e.g., the COF). Accordingly a machine learning system may be used to generate COF. In some examples, the incoming request and context may be embedded (e.g., as described above using a pre-trained transformer model). The embedded information (for COF prediction) may include not only the request, but also the system response and/or any subsequent turns of dialog with the user. These embeddings may be combined with encodings of additional metadata features (such as confidence scores from different modules in the online system) using a "mixing-encoder" to output the failure point predictions (e.g., the COF). Examples of natural language processing architectures are described below in reference to FIGS. 2 and 8.

Similar to PDR, a friction score may be output by a machine learning model that predicts an amount of friction that a user experiences based on an initial input utterance, the natural language processing system response, and/or one or more subsequent turns of dialog. The machine learning model may employ supervised learning techniques to predict friction on the basis of user sentiment, indicated in responses indicating the user's level of satisfaction with the current experience (e.g., that the user is satisfied/unsatisfied with the natural language processing system's response). For example, a user interrupting playback immediately after playback is begun ("Computer, no stop") and/or a user providing negative feedback ("No, that's not what I wanted") may be associated with a high friction score, while a user allowing playback to continue or providing positive feedback ("This is great" or "I love this song") may be associated with a relatively low friction score.

At action 132, for each cluster determined by clustering algorithm 124, one or more high-performing sub-groups of embeddings may be determined (based on PDR, friction, NLU/ASR error rates, etc.). For example, a high-performing sub-group may be determined on the basis of PDR<5%, NLU error rate<5%, and the average utterance count (number of embeddings) being ≥the average number of embeddings of the subgroups within the cluster. This is merely one example of how a "high-performing sub-group" may be identified. The particular metrics used and threshold values may vary according to the desired implementation. Similarly, one or more low performing sub-groups may be identified. In general, the various metadata indicating high performance (e.g., low error rates, low PDR, low friction, etc.) may characterize high-performing sub-groups, while metadata indicating low performance (e.g., high error rates, high friction, high PDR, etc.) may characterize low-performing sub-groups. There may be no size limitation (in terms of the number of utterances) required to designate a sub-group as a low-performing sub-group. This may enable the Remediation component 102 to correct for long-tail issues arising from poor performance on rare or infrequent utterances. At action 132, the metadata for a given high-performing sub-group (e.g., the top-performing sub-group) and a given low-performing subgroup may be compared in order to determine difference data 134. Difference data may describe the difference between like metric values. For example, if the average NLU error rate for the high-performing sub-group is 2% and the average NLU error rate for the low-performing sub-group is 31%, the difference data may reflect the delta value of 29% change in NLU error rate between the two sub-groups. Further examples are discussed below in reference to FIG. 3.

In various examples, the difference data 134 may be input into a decision component 136. The decision component 136 may include rule-based logic and/or a machine learning model trained to determine a remedial action 138 (which may include a recommended remedial action or an automated fix). Remedial action may include using a particular processing strategy for low-performing inputs, routing a given input to a particular application, set of API calls, etc. In the NLP context, remedial actions may include selection of a particular NLU strategy for low-performing utterances, routing a given low-performing utterance to a particular speech processing application, replacing a given ASR transcription with a different transcription, etc. Other remedial actions may include applying labels from high-performing sub-groups as synthetic labels for utterances of the low-performing sub-group and then using such synthetic training examples during retraining of various machine learning models of the natural language processing system 220 so that such models are able to learn to take more appropriate actions for the previously low-performing utterances. It should be noted that in some instances, instead of determining difference data 134 representing differences between how high-performing utterances and low-performing utterances were processed, the metadata 130 for the high-performing sub-group and the low-performing sub-group may be directly used by the decision component 136 to determine the remedial action 138. For example, a set of metadata representing how a high-performing utterance or group of high-performing utterances was processed by natural language processing system 220 and a set of metadata representing how one or more low-performing utterances were processed by natural language processing system 220 may be input into a machine learning model of the decision component 136. The machine learning model may be trained to predict a remedial action 138 on the basis of the input metadata. In some examples, difference data 134 may be generated representing differences between one or more values of the metadata. The difference data 134 may be input into the decision component 136 together with some or all of the metadata 130. Accordingly, in some cases, the decision component 136 may consider a combination of metadata 130 (for both the high-performing and low-performing utterances) as well as some difference data 134 representing differences between like values of the metadata (e.g., a difference between an NLU error rate for the high-performing utterance and the low-performing utterance). In addition, a decision tree and/or other rule-based system may be used to parse the metadata 130 for both high-performing and low-performing utterances in order to generate a remedial action 138.

Figure 2:
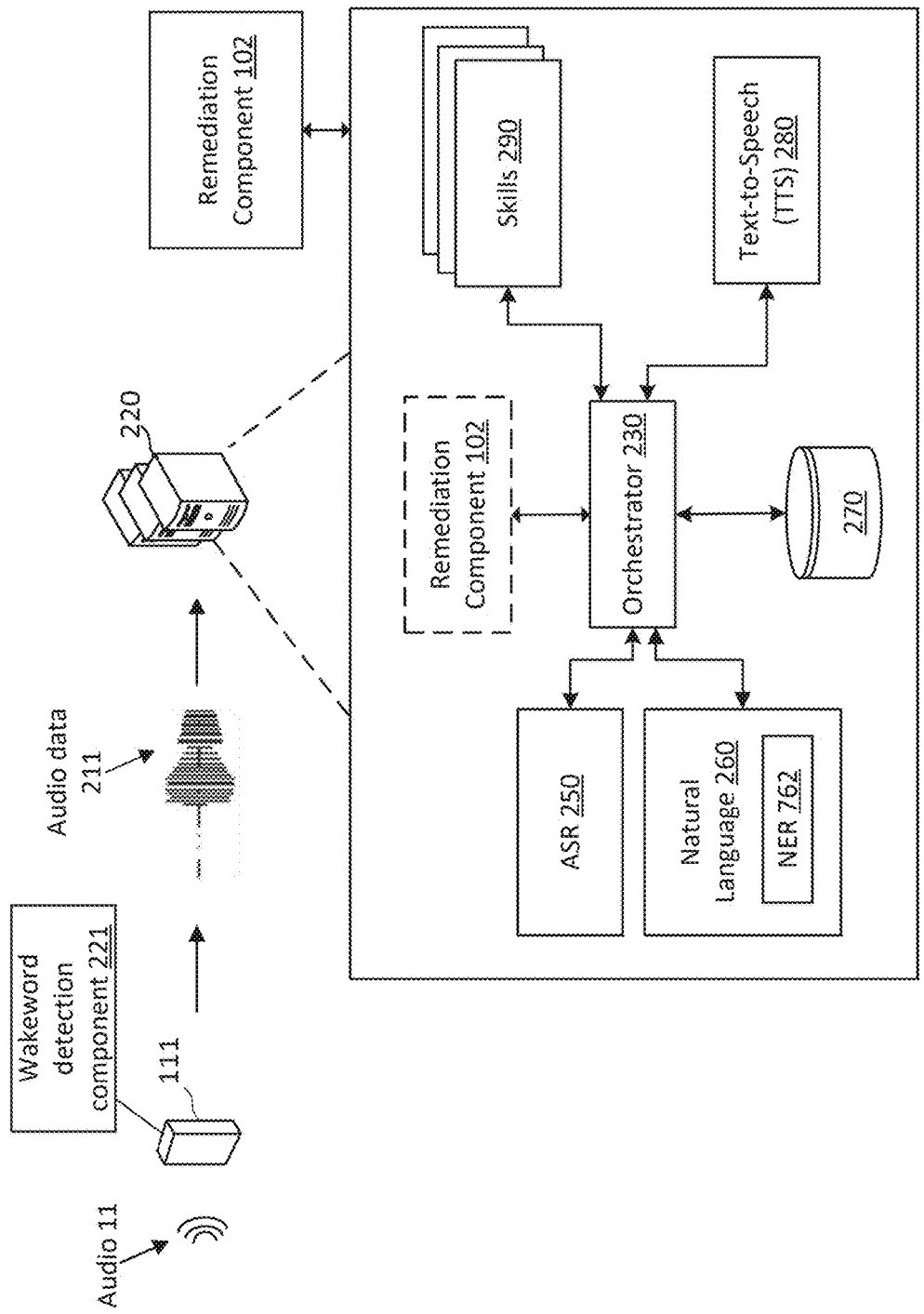
FIG. 2 is a block diagram of various components of a natural language processing system that may be used in accordance with various aspects of the present disclosure.
Figure 8:
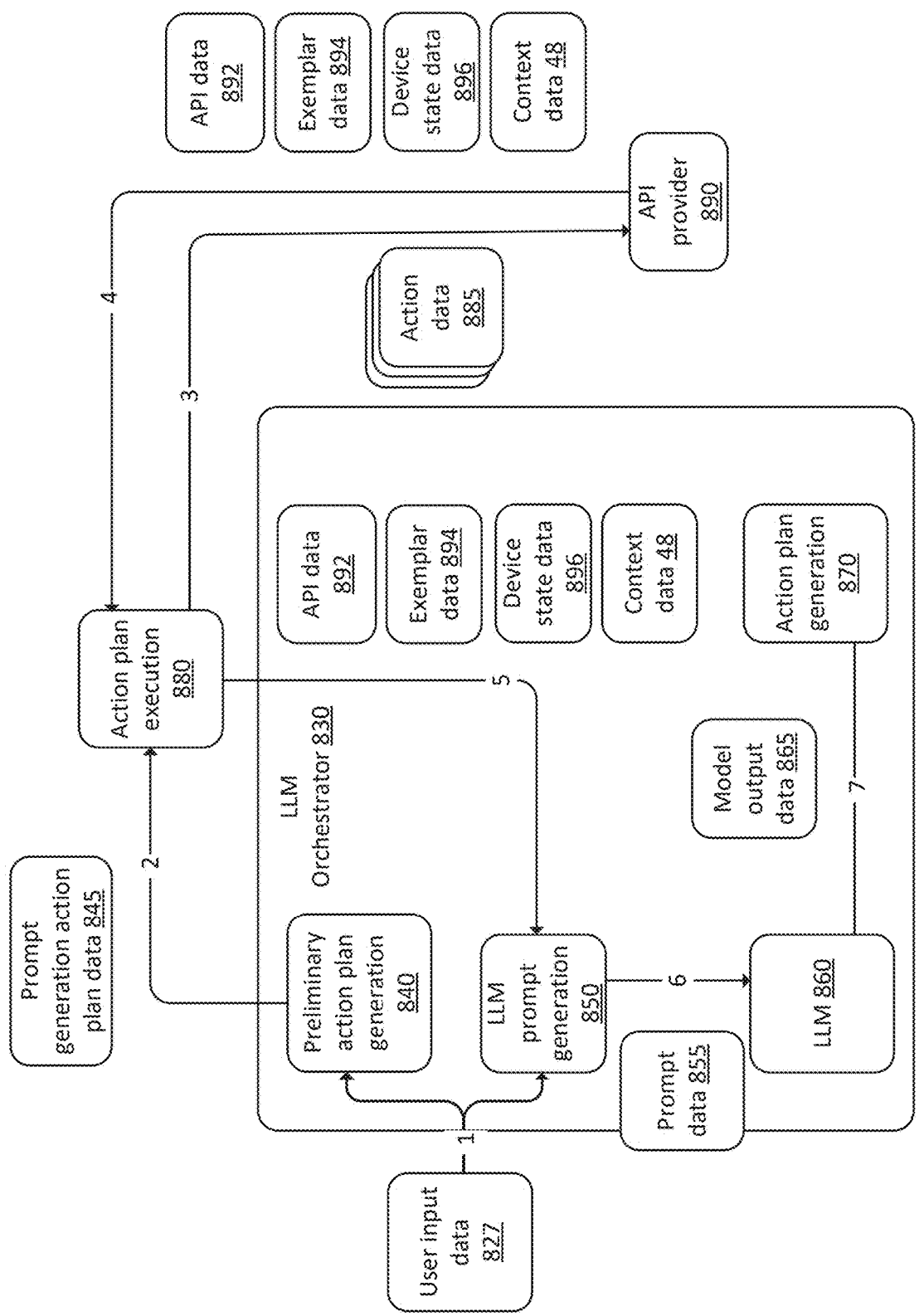
FIG. 8 depicts an example LLM-based natural language processing flow, in accordance with various aspects of the present disclosure.

FIG. 2 is a block diagram of various components of a natural language processing system 220 that may be used in accordance with various aspects of the present disclosure. The example natural language processing system 220 may be an example of a non-LLM-based natural language processing system that may be used in some contexts. An example of an LLM-based natural language processing system is shown in FIG. 8. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator component 230 may route the intent to one or more skill components 290 effective to process the intent (as well as slot data included in the utterance) to perform an action. If a valid TTS response is generated, the output may be synthesized as a wavform/synthetic speech using the TTS component 280. It should be noted that the natural language processing system 220 is merely one example of such a system. In another example, the natural language processing system 220 may instead employ a large language model (LLM) instead of the NLU component 260, the NER component 762, and/or the skills 290. In such an implementation, the LLM may be used to determine an action plan comprising formatted data (e.g., a series of application programming interface (API) calls to backend systems determined by the LLM as being constituent sub-actions related to carrying out the user's request.

Turning back to the example natural language processing system 220 depicted in FIG. 2, an audio capture component(s), such as a microphone or array of microphones of the device 111 (e.g., a network-connected device that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword.

The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used. In some examples, the Remediation component 102 may be used to improve the machine learning models used by the wakeword detection component 221 (such as those described above).

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated. As previously described, text data or other ASR output data generated by the ASR component 250 may be embedded using an LLM of the Remediation component 102.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request. As previously described, in some examples, machine learning models of the NLU component 260 (and/or NER component 762) may be updated using the Remediation component 102 (e.g., by identifying failing utterances that have historically suffered poor performance by the one or more machine learning models of NLU component 260 (and/or NER component 762) and/or by relabeling such utterances using synthetic labels associated with semantically-similar high-performing utterances.

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis. The selection of a skill component 290 to which to route a natural language input may be determined using one or more routing and/or skill selection machine learning models. Such models may also be improved using remediation component 102, as described above. Although remediation component 102 is depicted in FIG. 2 as a separate component from natural language processing system 220, in various examples, remediation component 102 may be implemented wholly, or in part, as part of natural language processing system 220, depending on the implementation. In at least some examples, the functionality of the NLU component 260, NER component 762, and/or one or more skills 290 may be performed using an LLM-based architecture.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill component 290a which may correspond to a service for performing media processing that may be operated, for example, by a media processing unit (MPU).

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any preconfigured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles and/or the person identifier data and/or account identifier data described herein. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
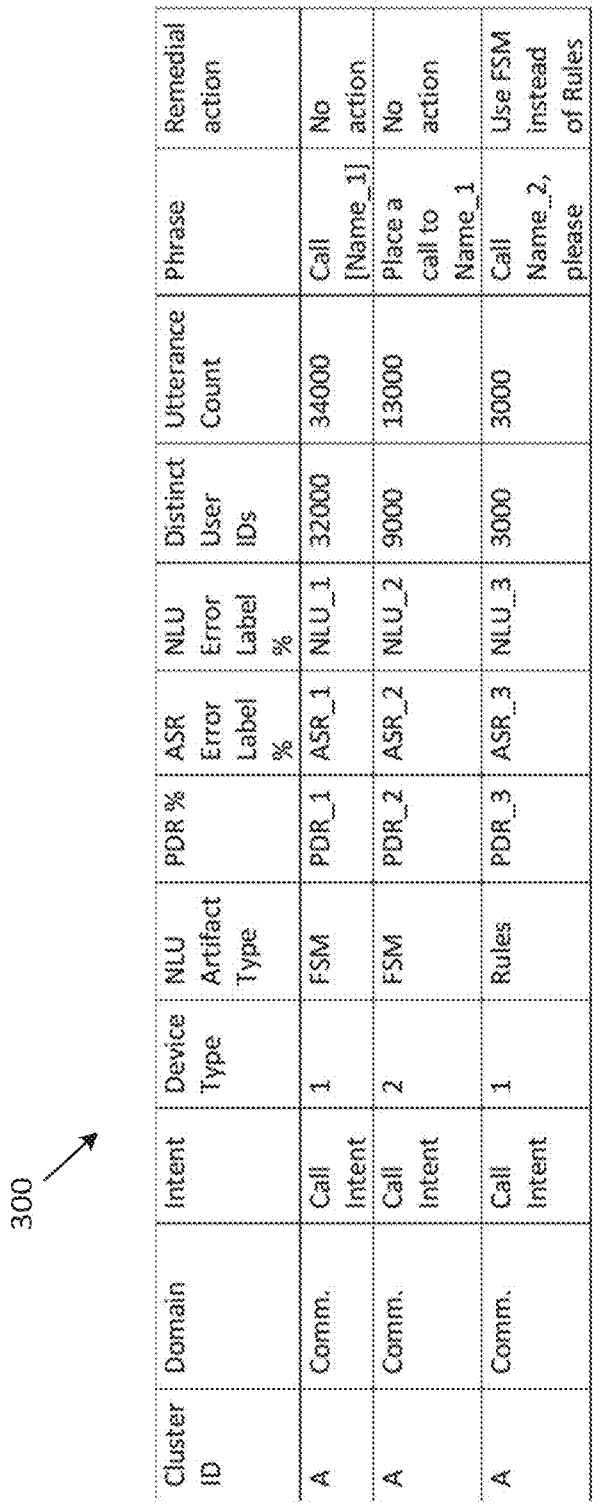
FIG. 3 depicts an example tabular representation of metadata that may be used by the natural language processing remediation component to determine a remedial action, in accordance with various aspects of the present disclosure.

FIG. 3 depicts an example tabular representation of metadata that may be used by remediation component 102 to determine a remedial action, in accordance with various aspects of the present disclosure. The example of FIG. 3 again pertains to use of the remediation component 102 in the context of a natural language processing system. Again, however, use of remediation component 102 is not limited to the NLP use case and may generally be used in any desired multi-stage processing system for machine self-learning. In the example table 300 of FIG. 3, three utterances may have been received: "Call Jakub," "Place a call to Jakub," and "Call Jacub, please", where "Jakub" is "Name_1" and "Jacub" is "Name_2." As shown, the three utterance embeddings (generated using encoder 120) have been embedded in the same cluster (Cluster A) using clustering algorithm 124.

Table 300 associates various metadata describing characteristics of processing these three utterances by the natural language processing system 220. The metadata may be used to identify high-performing sub-groups in Cluster A and low-performing sub-groups in Cluster A. For example, a high-performing sub-group may be a sub-group that has PDR<5% (in the example PDR_1 and PDR_2 may be 0.9 and 0.3, respectively, while PDR_3 may be 67%), NLU error label %<3% (NLU_1 may be 0.02, NLU_2 may be 0.11, and NLU_3 may be 25%), and which has greater than or equal to a median number of utterances of all sub-groups of Cluster A. In the example of FIG. 3, the utterances "Call Jakub" and "Place a call to Jakub" may be included in the high-performing sub-group. Conversely, the utterance "Call Jacub, please" may be in a low-performing sub-group. In this example, the low-performing sub-group may be determined based on the ASR error label % (ASR_1 may be an error label of 2.2%, ASR_2 may be an error label of 0.7%, and ASR_3 may be an error label of 63%) being greater than a threshold, PDR % being greater than a threshold, and/or NLU error label % being greater than a threshold. It should be noted that the particular thresholds and/or metadata types that are used to select the high- and low-performing sub-groups may vary according to the desired implementation. In the previously-described example, the utterance "Call Jacub, please" may be in a low-performing group as it has relatively high PDR % (PDR_3=67%), ASR error (ASR_3=63%), and relatively high NLU error (NLU_3=25%). There is an utterance count of 3,000 utterances in this low-performing group; accordingly, the metadata (e.g., the average metadata values among the 3,000 low-performing utterances) describing the utterances of this low-performing sub-group may be conceptually thought of as a defect signature for the low-performing sub-group.

As previously described in reference to FIG. 1, difference data describing a difference between the low-performing group and the high-performing group may be determined. In various examples, the difference data may include a difference between a first process used to process an input in the high-performing group and a second process used to process an input in the low-performing group. In the current example, the NLU artifact type indicating a type of NLU process (which may include, for example, a particular API call of an action plan output by an LLM in an LLM-based natural language processing system) used to interpret the utterance differs between the high-performing sub-group and the low-performing sub-group, with the high-performing phrases using a finite state machine (FSM) and the low-performing sub-group using a rules-based NLU approach. Accordingly, a remedial action may be to alter NLU routing for the phrase "Call Jacub, please" such that the FSM-based NLU is used to process this phrase in the future. In some examples, the difference data (and/or particular metadata such as some or all of what is shown in the table 300) may be sent to a machine learning model that may be trained to predict the remedial action based on the differences. For example, in table 300, it is noted that the device type differs between the three phrases. However, since device types 1 and 2 both appear in the high-performing sub-group, it may be unlikely that the device type is the source of the failure.

In some other examples, a low-performing group may be routed to a different natural language processing application (e.g., a skill and/or API of a different system) or a different domain relative to the high-performing sub-group. In such cases, a remedial action may be to correct the routing for the low-performing utterances and/or to re-train statistical models used to route natural language processing requests so that the low-performing utterances are more likely to be routed to the appropriate domain/natural language processing application.

As previously described, in some examples, label data applied to utterances in the high-performing sub-group may be used as synthetic labels for utterances in the low-performing sub-groups so that statistical models may be retrained using such synthetically-labeled training data to enable such models to better account for such utterances. For example, the ASR transcription of "Jakub" from the top row of table 300 may be applied as a ground truth label for the utterance in the bottom row of table 300. Accordingly, when a speech recognition model of the ASR component 250 is trained, the audio for the utterance may have the text label "Jakub" instead of "Jacub," which may reduce ASR error % for the model and enable the model to better transcribe spoken utterances.

Figure 4:
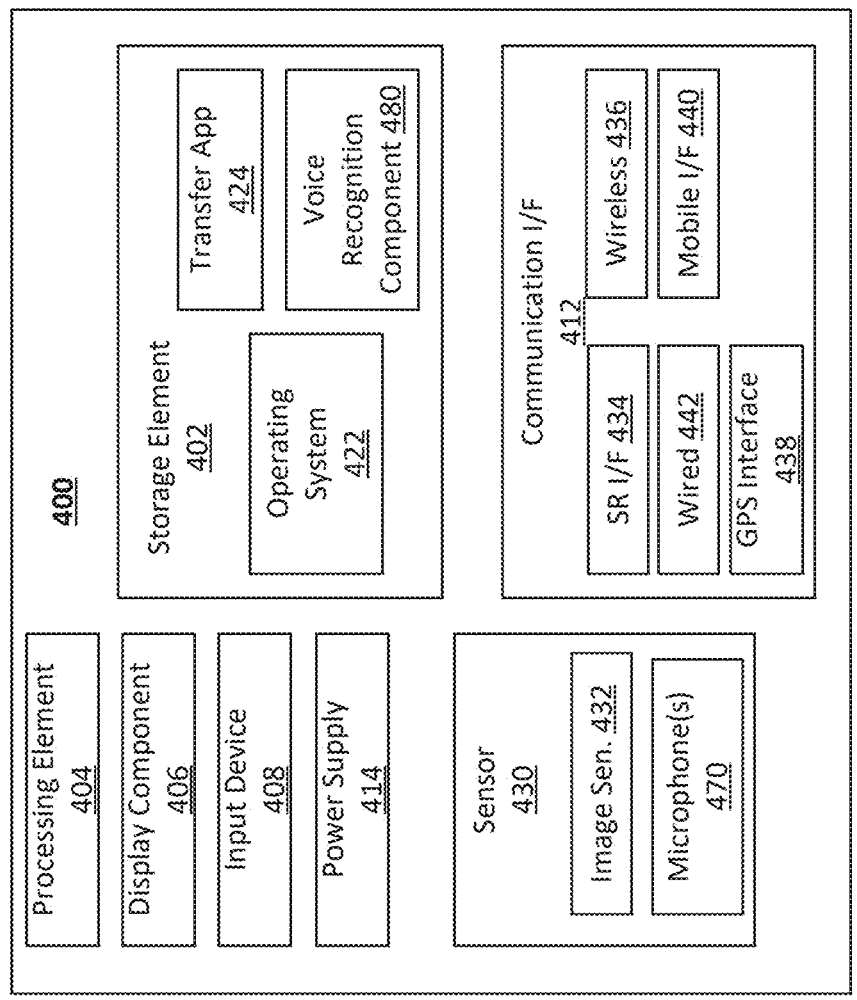
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise Remediation component 102.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
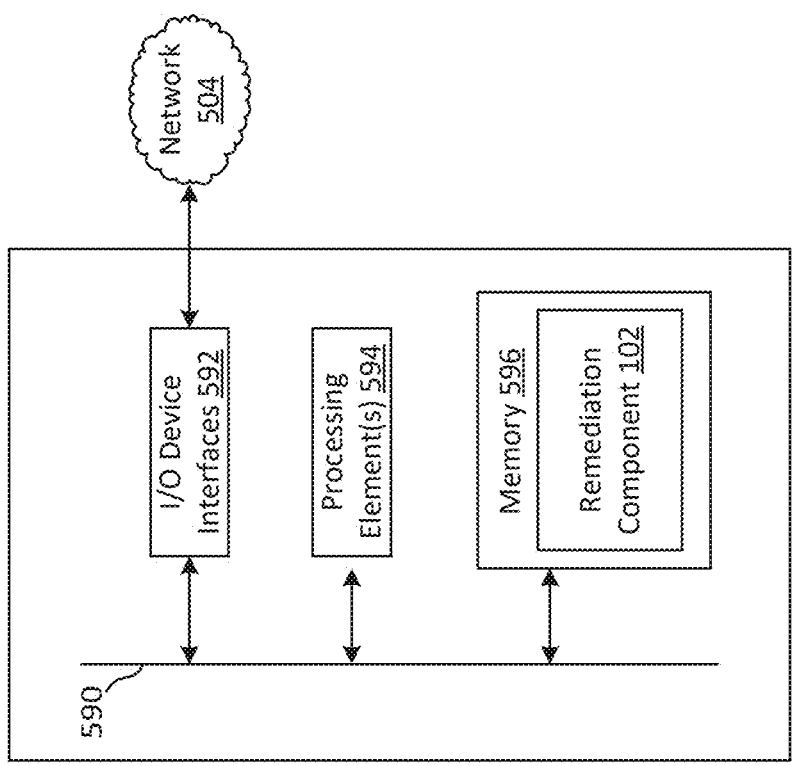
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows, when loaded from memory 596. In various further examples, memory 596 may be effective to store instructions effective to program controllers/processors 594 to perform the various techniques described above in reference to FIGS. 1-3. Accordingly, in FIG. 5, Remediation component 102 is depicted as being stored within memory 596, as an example. It should be noted that Remediation component 102 may be used in a real-time context (in which processing of utterances that are determined to likely experience a processing failure may be remediated in real time) or in an offline context. For example, in the offline context, labels from semantically similar high-performing utterances may be used as synthetic training labels for the low-performing utterances and various machine learning models may be retrained in order to achieve better performance for these low-performing utterances. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of natural language processing system 220 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
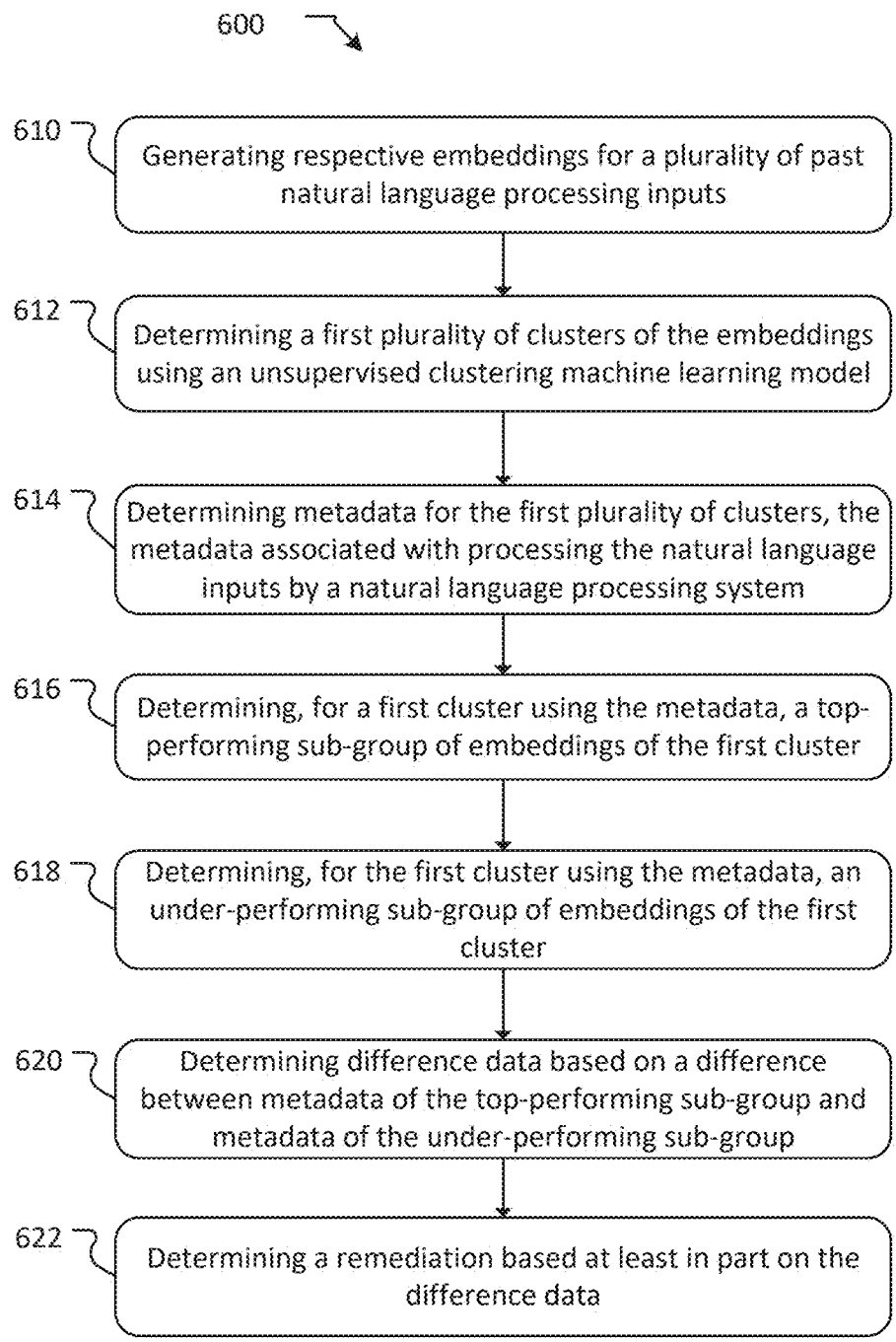
FIG. 6 depicts a flow chart showing an example process for determining a remedial action for like-failed natural language requests, in accordance with various aspects of the present disclosure.

FIG. 6 depicts a flow chart showing an example process 600 for determining a remedial action for like-failed natural language requests, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which respective embeddings for a plurality of past natural language processing inputs may be generated. For example, the remediation component 102 may receive an updated list of historical utterance data every 24 hours (or at any other desired cadence). Encoder 120 may be used to generate embeddings for each unique input, as previously described. Encoder 120 may be instantiated as an LLM (e.g., BERT) and/or using another text encoder (such as Word2Vec, GloVe, etc.). In other non-NLP contexts, the inputs may represent the type(s) of data received as input by the system (e.g., arrays, vectors, feature maps, particular file types, etc.) and the embeddings may be encoded representations of those inputs generated by one or more encoder models. Accordingly, the particular encoder 120 used may depend on the types of input data being encoded.

Processing may continue at action 612, at which a first plurality of clusters of the embeddings may be determined using an unsupervised clustering machine learning model (e.g., clustering algorithm 124). The clustering machine learning model may group embeddings that are more similar to one another (e.g., using a metric such as cosine similarity, Euclidean distance, etc.) into the same cluster while grouping other, more dissimilar embeddings into other clusters.

Processing may continue at action 614, at which metadata for the first plurality of clusters may be determined. The metadata may be associated with the natural language inputs (or other inputs represented by the embeddings) and/or with how such inputs were processed by the natural language processing system. Metadata may include such information as friction scores, PDR scores, NLU error, ASR error, top-NLU intent hypotheses and confidence scores, top-ASR hypotheses and confidence scores, context data, device type data, ETER, natural language processing applications selected for handling the inputs (e.g., selected skill(s), API calls in an action plan, etc.), natural language processing domains (e.g., music, smart home, communications), input count, etc.

Processing may continue at action 616, at which a determination may be made for the first cluster using the metadata of a top-performing sub-group of embeddings of the first cluster. For example, a sub-group of the first cluster with the lowest error rate(s), lowest friction, lowest PDR, etc. (and which satisfies any sub-group size requirement, in terms of number of embeddings, as previously described) may be selected as a top-performing (or high-performing) sub-group of the first cluster.

Processing may continue at action 618, at which a determination may be made for the first cluster using the metadata, an under-performing (e.g., a low-performing) sub-group of embeddings of the first cluster. The under-performing (or low-performing) sub-group may be determined on the basis of relatively high error rates, friction scores, PDR, ETER, etc. As previously noted, the particular metadata used to determine high- and low-performing sub-groups and the particular thresholds may vary according to the desired implementation.

Processing may continue at action 620, at which difference data may be determined based on the difference between metadata of the top-performing sub-group and metadata of the under-performing sub-group. As previously described, this difference data may be evaluated using one or more computer-implemented heuristics and/or may be input into a machine learning model trained to predict a remedial action based on the difference data. In still other examples, the difference data may be output via a graphical user interface (e.g., a data visualization) to allow developers to evaluate and interpret the differences in order to recommend and/or institute a remedial action. As previously described, in various examples, instead of, or in addition to, generation of difference data, the metadata of the top-performing sub-group and the metadata of the under-performing sub-group may directly be used by decision component 136 (e.g., a supervised machine learning model, computer-implemented decision tree logic, etc.).

Processing may continue at action 622, at which a remediation may be determined based at least in part on the difference data and/or the metadata. The remediation may be used to conform the under-performing sub-group to the high-performing sub-group. This may be accomplished in a variety of ways depending on the particular utterances at issue. For example, statistical models may be retrained to account for the under-performing utterances, patches (hot fixes) may be implemented to adjust the processing of the under-performing utterances, etc.

Figure 7:
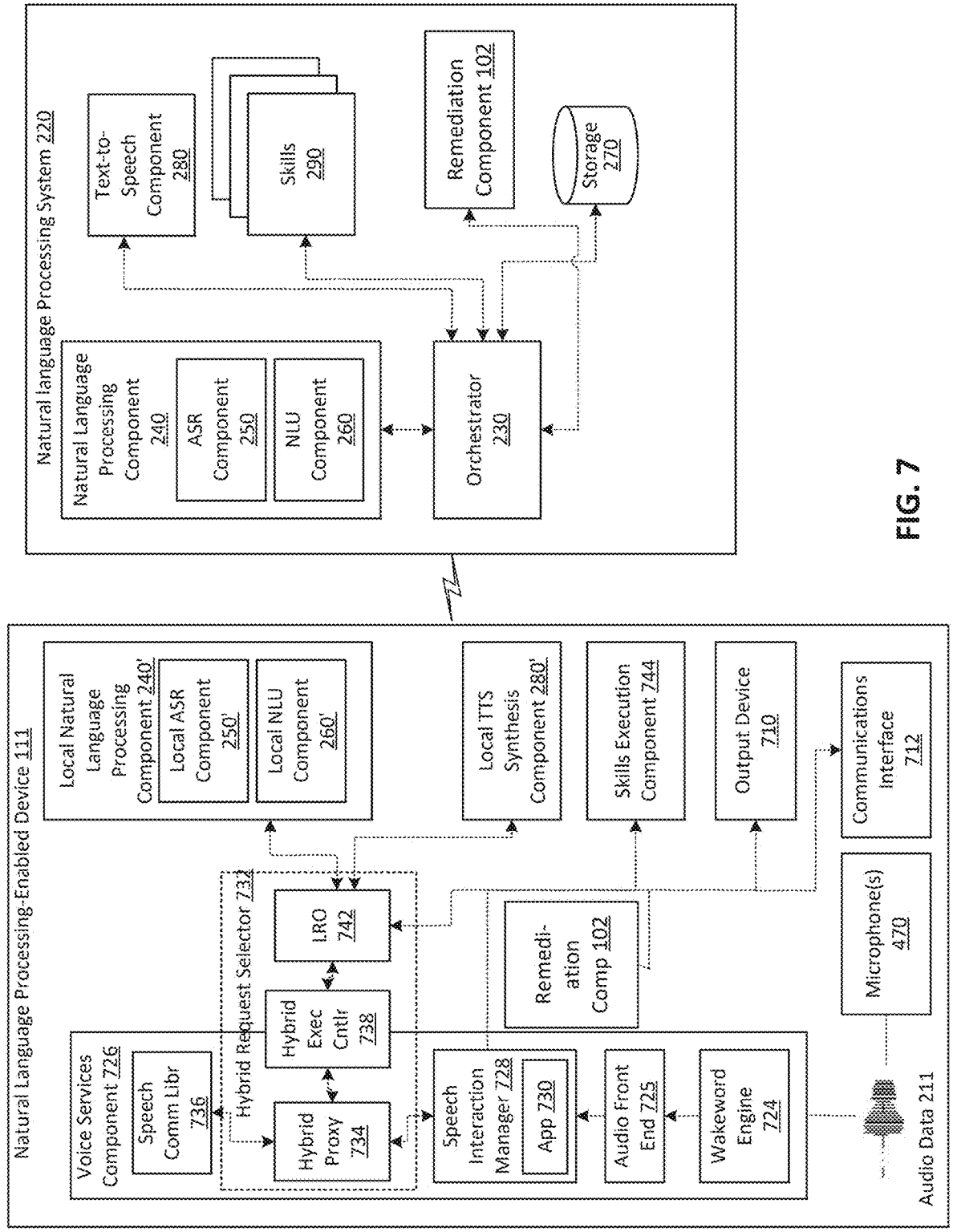
FIG. 7 is a block diagram illustrating a natural language processing enabled device and a natural language processing system, in accordance with embodiments of the present disclosure.

FIG. 7 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 710 (e.g., speakers, displays, and/or other network connected devices among network-connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with Remediation component 102. Accordingly, the device 111 may be used to detect under-performing utterances and/or to determine remedial actions that can be taken for under-performing utterances.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 712) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 710 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 710 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 726. When a user utterance including the wakeword is captured by the microphone 470 of the device 111, the audio data 211 representing the utterance is received by a wakeword engine 724 of the voice services component 726. The wakeword engine 724 may be configured to compare the audio data 211 to stored models used to detect a wakeword (e.g., "Computer") that indicates to the device 111 that the audio data 211 is to be processed for determining an intent. Thus, the wakeword engine 724 is configured to determine whether a wakeword is detected in the audio data 211, and, if a wakeword is detected, the wakeword engine 724 can proceed with routing the audio data 211 to an audio front end (AFE) 725 (sometimes referred to as an acoustic front end (AFE)) of the voice services component 726. If a wakeword is not detected in the audio data 211, the wakeword engine 724 can refrain from sending the audio data 211 to the AFE 725, thereby preventing the audio data 211 from being further processed. The audio data 211 can be discarded.

The AFE 725 is configured to transform the audio data 211 received from the wakeword engine 724 into data for processing by a suitable ASR component and/or NLU component. The AFE 725 may reduce noise in the audio data 211 and divide the digitized audio data 211 into frames representing a time intervals for which the AFE 725 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 725 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 725 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 725 in beamforming, may be determined based on results of the wakeword engine 724's processing of the audio data 211. For example, the wakeword engine 724 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 728 of the voice services component 726 may receive the audio data 211 that has been processed by the AFE 725. The SIM 728 may manage received audio data 211 by processing request data and non-speech noise or sounds as events, and the SIM 728 may also manage the processing of commands that are used to respond to the user speech or non-speech noise or sounds (e.g., by controlling the action(s) of natural language processing components of device 111). The SIM 728 may include one or more client applications 730 for performing various functions at the device 111.

A hybrid request selector component 732 of the device 111 is shown as including a hybrid proxy component (HP) 734, among other components. The HP 734 can be implemented as a layer within the voice services component 726 that is located between the SIM 728 and a speech communication library (SCL) 736, and may be configured to proxy traffic to/from the natural language processing system 220. For example, the HP 734 may be configured to pass messages between the SIM 728 and the SCL 736 (such as by passing events and instructions there between), and to send messages to/from a hybrid execution controller component (HEC) 738 of the hybrid request selector component 732. For instance, command data received from the natural language processing system 220 can be sent to the HEC 738 using the HP 734, which sits in the path between the SCL 736 and the SIM 728. The HP 734 may also be configured to allow audio data 211 received from the SIM 728 to pass through to the natural language processing system 220 (via the SCL 736) while also receiving (e.g., intercepting) this audio data 211 and sending the received audio data 211 to the HEC 738 (sometimes via an additional SCL).

As will be described in more detail below, the HP 734 and the HEC 738 are configured to perform a handshake procedure to connect to each other. As part of this handshake procedure, the HP 734 and the HEC 738 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 738 determines whether to accept or reject the connection request from the HP 734. If the HEC 738 rejects the HP's 734 connection request, the HEC 738 can provide metadata to the HP 734 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 732 may further include a local request orchestrator component (LRO) 742. The LRO 742 is configured to notify the local natural language processing component 240' about the availability of new audio data 211 that represents user speech, and to otherwise initiate the operations of the local natural language processing component 240' when new audio data 211 becomes available. In general, the hybrid request selector component 732 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 742 may interact with a skills execution component 744 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 724, which detects the wakeword "Computer," and forwards the audio data 211 to the SIM 728 via the AFE 725 as a result of detecting the wakeword. The SIM 728 may send the audio data 211 to the HP 734, and the HP 734 may allow the audio data 211 to pass through to the natural language processing system 220 (e.g., via the SCL 736), and the HP 734 may also input the audio data 211 to the local natural language processing component 240' by routing the audio data 211 through the HEC 738 of the hybrid request selector 732, whereby the LRO 742 notifies the local natural language processing component 240' of the incoming audio data 211. At this point, the hybrid request selector 732 may wait for response data from the natural language processing system 220 and/or the local natural language processing component 240'.

The local natural language processing component 240' is configured to receive the audio data 211 from the hybrid request selector 732 as input, to recognize speech (and/or non-speech audio events) in the audio data 211, to determine an intent (e.g., user intent) from the recognized speech (or non-speech audio event). This intent can be provided to the skills execution component 744 via the LRO 742, and the skills execution component 744 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 744 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 744) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the Remediation component 102 may be instantiated as a part of the natural language processing system 220 and/or as a separate component configured in communication with the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

FIG. 8 depicts an example LLM-based natural language processing flow, in accordance with various aspects of the present disclosure. The example architecture in FIG. 8 includes an LLM orchestrator 830 and various other components for determining an action responsive to a user input. The architecture may further include an action plan execution component 880 and an API provider component 890. With reference to FIG. 8, the LLM orchestrator 830 may include a preliminary action plan generation component 840, a LLM prompt generation component 850, an LLM 860, and an action plan generation component 870. In various examples, the LLM 860 may be a generative model.

In some examples, the LLM 860 may be a transformer-based seq2seq model involving an encoder-decoder architecture. In some such embodiments, the LLM 860 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM 860 may be pre-trained for approximately 1 trillion tokens (although the specific number of tokens may be implementation dependent). Being trained on CLM tasks, the LLM 860 may be capable of in-context learning. An example of such a LLM is Alexa Teacher Model (Alexa™).

In various examples, the input to the LLM 860 may be in the form of a prompt. A prompt may be a natural language input, for example, an instruction, for the LLM 860 to generate an output according to the prompt. The output generated by the LLM 860 may be a natural language output responsive to the prompt. The prompt and the output may be text in a particular spoken language. For example, for an example prompt "how do I cook beans?", the LLM 860 may output a recipe (e.g., a step-by-step process) to cook beans. As another example, for an example prompt "I am hungry. What restaurants in the area are open?", the LLM may output a list of restaurants near the user that are open at the current time.

The LLM 860 may be configured using various learning techniques. For example, in some embodiments, the LLM 860 may be configured (e.g., "fine tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LLM 860 may be configured using one-shot learning, which is similar to few-shot learning, except the model is provided with a single example. As another example, in some embodiments, the LLM 860 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator 830 may be configured for generating the prompt to be used by the LLM 860 to determine an action responsive to a user input. As shown in FIG. 8, the LLM orchestrator 830 receives (at step 1) user input data 827. In some instances, the user input data 827 may correspond to a text or tokenized representation of a user input. For example, prior to the LLM orchestrator 830 receiving the user input data 827, another component (e.g., an ASR component) may receive audio data representing the user input. The ASR component may perform ASR processing on the audio data to determine ASR output data corresponding to the user input. As previously described, the ASR component (e.g., ASR component 250) may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 827 may include a top scoring ASR hypothesis of the ASR data.

As illustrated in FIG. 8, the user input data 827 may be received at the preliminary action plan generation component 840 and the LLM prompt generation component 850 of the LLM orchestrator 830. The preliminary action plan generation component 840 processes the user input data 827 to generate prompt generation action plan data 845 corresponding to an instruction(s) (e.g., a request(s)) for one or more portions of data usable to generate a language model prompt for determining an action responsive to the user input). In some examples, the one or more portions of data may be data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the user input data 827 represents a user input of "please turn on the kitchen lights every morning at 7 am," then the preliminary action plan generation component 840 may determine prompt generation action plan data 845 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the user input data 827 represents a user input of "What is the elevation of Mt. Everest," then the preliminary action plan generation component 840 may determine prompt generation action plan data 845 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant.

In some examples, the prompt generation action plan data 845 may include one or more executable API calls usable for retrieving the one or more portions of data from the corresponding component. For example, instructions included in the prompt generation action plan data 845 may include "FETCH_API," "FETCH_EXEMPLAR," "FETCH_DEVICE_STATE," "FETCH_CONTEXT," etc., along with optional API arguments/inputs. In some embodiments, the prompt generation action plan data 845 may also include the user input data 827. The prompt generation action plan data 845 may be sent (at step 2) to the action plan execution component 880.

In some examples, the preliminary action plan generation component 840 may be configured to process the user input data 827 to determine a representation of the user's request. In various examples, the representation of the user's request may be a reformulation of the user's request. For example, the if the user input data 827 represents a user input of "I have always wanted to travel to Japan, I have heard it's beautiful. How tall is Mt. Fuji?", then the preliminary action plan generation component 840 may determine the representation of the user's request as being "How tall is Mt. Fuji," or the like. The preliminary action plan generation component 840 may generate the prompt generation action plan data 845 using the determined representation of the user's request.

In some examples, the preliminary action plan generation component 840 may implement one or more machine learning (ML) models. A first ML model(s) may be configured to take as input the user input data 827 and generate a representation of the user's request. For example, the ML model may be a text summarization model or a text rewrite model. A second ML model (or the first ML model) may be configured to take as input the representation of the user's request (or the user input data 827) and determine the one or more portions of data relevant for processing of the user input. For example, the second ML model may be a classifier trained to classify the user's request (or the user input data 827) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 840 may be an LLM, similar to the LLM 860. In such embodiments, the architecture (e.g., LLM-based processing flow 14) may include a further component configured to generate a prompt to be provided to the LLM (e.g., similar to the LLM prompt generation component 850) or the prompt may be generated by the LLM prompt generation component 850. The component may generate a prompt (e.g., according to a template) including the user input data 827 and instructions to determine the one or more portions of data (or types of data) relevant to the processing of the user input. The LLM may process the prompt and generate model output data representing the one or more portions of data (or types of data). The preliminary action plan generation component 840 may process the model output data to determine the prompt generation action plan data 845.

The action plan execution component 880 may process the prompt generation action plan data 845 to execute the one or more instructions to retrieve/receive data corresponding to the user input and that may be used to generate the language model prompt. As shown in FIG. 8, the action plan execution component 880 processes the prompt generation action plan data 845 to generate action data 885 representing an action included in the prompt generation action plan data 845 (e.g., a single instruction, such as FETCH_CONTEXT). For example, in the situation where the action is represented by an API call, the action data 885 may represent the action plan execution component 880 executing the API call included in the prompt generation action plan data 845. The action data 885 may be sent (at step 3) to the API provider component 890. In the situation where the prompt generation action plan data 845 includes more than one instruction, the action plan execution component 880 may generate more than one instance of action data 885 (e.g., one instance for each instruction included in the prompt generation action plan data 845) and send each instance to the API provider component 890.

The API provider component 890 may process the (one or more instances of the) action data 885 and cause the retrieval of the (one or more portions of) data associated with the action data 885. The API provider component 890 may include a knowledge provider component. The knowledge provider component may include an API retrieval component, an exemplar retrieval component, a device state retrieval component, and an "other" context retrieval component. The knowledge provider component may provide the action data 885 to the component(s) configured to determine the data corresponding to the request(s) represented by the action data 885.

For example, the API retrieval component (not shown) may process the action data 885 to generate API data 892 representing one or more APIs that correspond to an action performable with respect to the user input. For example, if the user input corresponds to "turn on the kitchen light," the API retrieval component may determine an API usable to control a device and include an API definition corresponding to the API in the API data 892. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 892 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 892. In some embodiments, the API retrieval component may include the top-n identified API definitions in the API data 892. The API data 892 may be sent (at step 4) to the action plan execution component 880 as shown in FIG. 8.

For further example, the exemplar retrieval component may process the action data 885 to generate exemplar data 894 representing one or more exemplars associated with one or more APIs (e.g., the API represented by the API data 892). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 894 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light everyday at 7 am," the exemplar retrieval component may select an exemplar representing:
{
User: turn on the kitchen light everyday at 7 am
Thought: the customer is trying to create a routine
Action:
Routine.create_routine
  (trigger=Routine.create_time_trigger(hour=7),
  action=Routine.create_turn_on_action
  (device="kitchen light"))
Observation: routine created successfully
Thought: time to respond
Response: I have created a routine for you. Anything else?
}

Although not illustrated in FIG. 8, in some embodiments, the API provider component 890 and/or a knowledge provider component may provide the exemplar retrieval component with the action data 885 and a list of API call(s) to which the determined exemplars are to be associated (e.g., the API call(s) included in the API data 892). In some embodiments, the one or more exemplars may be included in the exemplar data 894 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 894. In some embodiments, the exemplar retrieval component may include the top-n identified exemplars in the exemplar data 894. The exemplar data 894 may be sent (at step 4) to the action plan execution component 880 as shown in FIG. 8.

As another example, a device state retrieval component (not shown in FIG. 8) may process the action data 885 to generate device state data 896 representing one or more states of one or more devices associated with/relevant to the user input (e.g., whether the device is powered on or off, a volume level associated with the device, etc.). For example, if the user input corresponds to "Please turn on the kitchen light," the device state data 896 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 896. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 896. The device state data 896 may be sent (at step 4) to the action plan execution component 880 as shown in FIG. 8.

As a further example, a context retrieval component (not shown) may process the action data 885 to generate other context data 48 (apart from the device state data 896, the API data 892, the exemplar data 894, etc.) representing one or more contexts associated with/relevant to the user input. For example, the other context data 898 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 48 may include the top-n identified context in the other context data 48. The other context data 48 may be sent (at step 4) to the action plan execution component 880 as shown in FIG. 8.

In some embodiments, the knowledge provider component may be configured to cause one or more of the API retrieval component, the exemplar retrieval component, the device state retrieval component, and the other context retrieval component to process based on the data output by one or more of the components of the knowledge provider component. For example, if the output of the API retrieval component (e.g., the API data 892) indicates that a related API definition was identified, then the knowledge provider component (or another component) may cause the exemplar retrieval component to process to determine one or more exemplars related to the identified API definitions. For further example, if the output of the API retrieval component (e.g., the API data 892) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 840, as discussed above).

The action plan execution component 880 may send (step 5) the data received from the API provider component 890 (e.g., the API data 892, the exemplar data 894, the device state data 896, and the other context data 48) to the LLM prompt generation component 850. The LLM prompt generation component 850 may be configured to generate prompt data 855 (e.g., using the user input data 827, the API data 892, the exemplar data 894, the device state data 896, and/or the other context data 48) to be used by the LLM 860.

In some examples, the LLM prompt generation component 850 may generate the prompt data 855 representing a prompt for input to the LLM 860. In some embodiments, such prompt data 855 may be generated based on combining the user input data 827, the API data 892, the exemplar data 894, the device state data 896, and the other context data 48. The prompt data 855 may be an instruction to determine an action(s) responsive to the user input data 827 given the other information (e.g., the API data 892, the exemplar data 894, the device state data 896, the other context data 48) included in the prompt data 855. In some embodiments, the LLM prompt generation component 850 may also include in the prompt data 855 a sample processing format to be used by the LLM 860 when processing the prompt and generating the response. In some embodiments, the prompt data 855 may be generated according to a template format. For example, the prompt data 855 may adhere to a template format of:

{
You have access to the following API's:
[API(s)(e.g., the API data 192)]
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples:
[Exemplar(s) (e.g., the exemplar data 894)]
Context: [device state(s) (e.g., the device state data 896)] [other context(s) (e.g., the other context data 48)]
User: [the user input (e.g., the user input data 827)]
}

In some examples, the template format may instruct the LLM 860 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LLM 860 to generate an output representing the determined interpretation of the user input by the LLM 860 (e.g., the user is requesting [intent of the user input], the user is trying to [intent of the user Input], etc.) As another example, the format may include the label "Observation:" labeling the following string of characters/tokens as the result of performance of an action determined by the LLM 860/the LLM 860's interpretation of the result of the performance of the action determined by the LLM 860. As a further example, the format may include a label of "Response:" instructing the LLM 860 to generate a response (e.g., a natural language output for a user) to the prompt.

Following such a template format, for example, and for a user input of "turn on the living room light" and corresponding API data, exemplar data, device state data, and other context data, the LLM prompt generation component 850 may generate example prompt data 855*a*:

{
You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples:
User: turn on all indoor lights
Thought: the user is trying to turn lights on
Action: turn_on_device (device="indoor light 1")
turn_on_device (device="indoor light 2")
Observation: success success
Thought: time to respond
Response: Anything else I can help you with?
Context: the user has the following devices, bathroom light,
bedroom light, kitchen light, and living room light.
User: turn on the living room light.
}

In some embodiments, the LLM prompt generation component 850 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM 860 processes the prompt data 855 to generate model output data 865 representing an action responsive to the user input. For example, based on processing the example prompt data provided above, the LLM 860 may output model output data 865: {"Thought: the user is trying to turn on the living room light; Action: turn_on_device (device="living room light"),"} or the like. The model output data 865 is sent (at step 7) to the action plan generation component 870. The action plan generation component 870 may parse the model output data 865 to determine action plan data representing the action generated by the LLM 860. For example, for the model output data 865: "Action: turn_on_device (device="living room light")," the corresponding action plan data may correspond to "turn_on_device (device="living room light")" (e.g., corresponding to the action generated by the LLM 860, without the label of "Action"). In some embodiments, the action plan generation component 870 may determine an API call corresponding to the "Action" data included in the model output data 865. For example, in some embodiments, the action plan generation component 870 may fill in the arguments/inputs, if any, for the API call, which may be included in the action plan data. For further example, in some embodiments, the action plan execution component 880 may fill in the arguments/inputs, if any, for the API call.

In some embodiments, the LLM orchestrator 830 (e.g., the action plan generation component 870 or another component of the LLM orchestrator 830) may determine whether the LLM 860 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 830 may use a knowledge base, web search, etc. to fact-check information included in the output.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Additionally, the frequency of execution of the various actions described herein may vary. For example, computer-executable actions may occur during runtime, in real-time (or near real-time), in batches (such as hourly batches, daily batches, etc.) depending on the desired implementation.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
    determining a first set of unique natural language inputs received by a natural language processing system over a first time period;
    generating, using a large language model (LLM) encoder, a respective embedding for each natural language input of the first set of unique natural language inputs;
    generating at least a first cluster of the respective embeddings using an unsupervised clustering machine learning model;
    determining a first embedding assigned to the first cluster by the unsupervised clustering machine learning model, wherein the first embedding represents a first natural language input of the first set of unique natural language inputs that experienced a failure during processing;
    determining first metadata describing how the first natural language input was processed by the natural language processing system;
    determining a second embedding assigned to the first cluster by the unsupervised clustering machine learning model, wherein the second embedding represents a second natural language input of the first set of unique natural language inputs that experienced successful processing;
    determining second metadata describing how the second natural language input was processed by the natural language processing system;
    determining, using the first metadata and the second metadata, difference data describing at least one difference between how the first natural language input was processed by the natural language processing system and how the second natural language input was processed by the natural language processing system; and
    generating first output data comprising a remedial action correcting a way in which a future natural language input is to be processed by the natural language processing system.

2. The computer-implemented method of claim 1, further comprising:
    determining a first sub-group of embeddings assigned to the first cluster with natural language understanding (NLU) error metrics that are less than an NLU error metric threshold, wherein the first sub-group of embeddings comprises the second embedding;
    determining a first number of embeddings of the first sub-group; and
    determining that the first number of embeddings is greater than or equal to a median number of embeddings of sub-groups assigned to the first cluster, wherein the determining the difference data further comprises comparing the first metadata to third metadata associated with embeddings of the first sub-group.

3. The computer-implemented method of claim 1, further comprising:
    determining first label data for the second natural language input, the first label data comprising at least one of a first intent determined for the second natural language request or a first speech processing application selected for processing the second natural language input; and
    assigning the first label data to the first natural language input, wherein the remedial action comprises retraining a first machine learning model using the first natural language input and the first label data.

4. A method comprising:
    generating, for a first input processed by a first system component, first embedding data representing the first input;
    generating, using a first machine learning model, a first cluster of embeddings comprising the first embedding data;
    determining second embedding data assigned to the first cluster by the first machine learning model, the second embedding data representing a second input;
    determining first metadata for the first input, the first metadata associated with processing of the first input request by the first system component;
    determining second metadata for the second input, the second metadata associated with processing of the second input by the first system component; and
    generating, based at least in part on the first metadata and the second metadata, output data representing a first remedial action for processing of future inputs.

5. The method of claim 4, further comprising:
    determining a first sub-group of embeddings assigned to the first cluster based at least in part on respective error rates of the embeddings of the first sub-group of embeddings, wherein the first sub-group of embeddings comprises the second embedding data, and wherein the first sub-group of embeddings is associated with inputs that were successfully-processed by the first system component.

6. The method of claim 5, further comprising:
    determining a first number of embeddings in the first sub-group of embeddings;
    determining an average number of embeddings among sub-groups in the first cluster; and comparing the first metadata to metadata of at least one embedding of the first sub-group based at least in part on the first number of embeddings being greater than or equal to the average number of embeddings.

7. The method of claim 4, further comprising:
determining, for the first input, a first error rate, wherein the first metadata comprises the first error rate;
determining, for the second natural language request, a second error rate, wherein the second metadata comprises the second error rate; and
determining difference data comprising a difference between the first error rate and the second error rate, wherein the output data is generated further based at least in part on the difference data.

8. The method of claim 4, further comprising:
determining, for the first input, a first processing technique, wherein the first metadata comprises metadata identifying the first technique;
determining, for the second input, a second processing technique, wherein the second metadata comprises metadata identifying the second processing technique;
determining difference data comprising a difference between the first processing technique and the second processing technique, wherein the output data is generated further based at least in part on the difference data.

9. The method of claim 4, further comprising:
determining, for the first input, first cause of failure (COF) data describing a failure type experienced during processing of the first input by the first system component, wherein the generating the first cluster of embeddings is performed based at least in part on the COF indicating that the failure type is associated with natural language understanding error.

10. The method of claim 4, further comprising:
determining, from the first metadata, that a first application was selected to process the first input; and
determining, from the second metadata, that a second application was selected to process the second input, wherein the first remedial action comprises routing future instances of the first input to the second application.

11. The method of claim 4, further comprising:
determining first label data associated with the second input, the first label data comprising at least one of a first action determined for the second input or a first application selected for processing the second input; and
assigning the first label data to training data comprising the first input, wherein the first remedial action comprises retraining a first machine learning model using the first input and the first label data.

12. The method of claim 4, further comprising:
determining a first sub-group of embeddings of the first cluster associated with natural language inputs that were successfully processed by the first system component;
determining a second sub-group of embeddings of the first cluster associated with natural language inputs that were unsuccessfully processed by the first system component;
determining third metadata associated with the first sub-group of embeddings;
determining fourth metadata associated with the second sub-group of embeddings; and
determining second output data representing a second remedial action for natural language inputs of the second sub-group based at least in part on the third metadata and the fourth metadata.

13. A system comprising:
at least one processor; and
non-transitory computer-readable memory storing instructions that, when executed by the at least one processor, are effective to:
generate, for a first input processed by a first system component, first embedding data representing the first input;
generate, using a first machine learning model, a first cluster of embeddings comprising the first embedding data;
determine second embedding data assigned to the first cluster by the first machine learning model, the second embedding data representing a second input;
determine first metadata for the first input, the first metadata associated with processing of the first input request by the first system component;
determine second metadata for the second input, the second metadata associated with processing of the second input by the first system component; and
generate, based at least in part on the first metadata and the second metadata, output data representing a first remedial action for processing of future inputs.

14. The system of claim 13, the non-transitory computer-readable memory storing further instructions that, when executed by the at least one processor, are further effective to:
determine a first sub-group of embeddings assigned to the first cluster based at least in part on respective error rates of the embeddings of the first sub-group of embeddings, wherein the first sub-group of embeddings comprises the second embedding data, and wherein the first sub-group of embeddings is associated with inputs that were successfully-processed by the first system component.

15. The system of claim 14, the non-transitory computer-readable memory storing further instructions that, when executed by the at least one processor, are further effective to:
determine a first number of embeddings in the first sub-group of embeddings;
determine an average number of embeddings among sub-groups in the first cluster; and
compare the first metadata to metadata of at least one embedding of the first sub-group based at least in part on the first number of embeddings being greater than or equal to the average number of embeddings.

16. The system of claim 13, the non-transitory computer-readable memory storing further instructions that, when executed by the at least one processor, are further effective to:
determine, for the first input, a first error rate, wherein the first metadata comprises the first error rate;
determine, for the second natural language request, a second error rate, wherein the second metadata comprises the second error rate; and
determine difference data comprising a difference between the first error rate and the second error rate, wherein the output data is generated further based at least in part on the difference data.

17. The system of claim 13, the non-transitory computer-readable memory storing further instructions that, when executed by the at least one processor, are further effective to:

determine, for the first input, a first processing technique, wherein the first metadata comprises metadata identifying the first technique;

determine, for the second input, a second processing technique, wherein the second metadata comprises metadata identifying the second processing technique;

determine difference data comprising a difference between the first processing technique and the second processing technique, wherein the output data is generated further based at least in part on the difference data.

18. The system of claim 13, the non-transitory computer-readable memory storing further instructions that, when executed by the at least one processor, are further effective to:

determine, for the first input, first cause of failure (COF) data describing a failure type experienced during processing of the first input by the first system component, wherein the generating the first cluster of embeddings is performed based at least in part on the COF indicating that the failure type is associated with natural language understanding error.

19. The system of claim 13, the non-transitory computer-readable memory storing further instructions that, when executed by the at least one processor, are further effective to:

determine, from the first metadata, that a first application was selected to process the first input; and determine, from the second metadata, that a second application was selected to process the second input, wherein the first remedial action comprises routing future instances of the first input to the second application.

20. The system of claim 13, the non-transitory computer-readable memory storing further instructions that, when executed by the at least one processor, are further effective to:

determine first label data associated with the second input, the first label data comprising at least one of a first action determined for the second input or a first application selected for processing the second input; and assign the first label data to training data comprising the first input, wherein the first remedial action comprises retraining a first machine learning model using the first input and the first label data.

\* \* \* \* \*